US010977706B2

(12) United States Patent
Felder

(10) Patent No.: US 10,977,706 B2
(45) Date of Patent: Apr. 13, 2021

(54) SYSTEM OF ON-LINE SALES OFFERINGS OF CIRCULAR ADORNMENTS WITH RELIABLE SIZE AND SHAPE 3-D POLYMER REPRESENTATIONS

(71) Applicant: Chaim Felder, Far Rockaway, NY (US)

(72) Inventor: Chaim Felder, Far Rockaway, NY (US)

( * ) Notice: Subject to any disclaimer, the term of this patent is extended or adjusted under 35 U.S.C. 154(b) by 0 days.

(21) Appl. No.: 16/732,245

(22) Filed: Dec. 31, 2019

(65) Prior Publication Data
US 2020/0134687 A1 Apr. 30, 2020

Related U.S. Application Data

(62) Division of application No. 14/956,225, filed on Dec. 1, 2015, now Pat. No. 10,521,842.

(51) Int. Cl.
*G06Q 30/06* (2012.01)
*G06Q 30/00* (2012.01)
*B33Y 50/00* (2015.01)
*B33Y 80/00* (2015.01)
*B29C 64/386* (2017.01)
(Continued)

(52) U.S. Cl.
CPC ....... *G06Q 30/0621* (2013.01); *B29C 64/386* (2017.08); *B33Y 50/00* (2014.12); *B33Y 80/00* (2014.12); *G05B 19/4099* (2013.01); *G06Q 30/00* (2013.01); *B33Y 50/02* (2014.12); *G05B 2219/49007* (2013.01); *G06Q 30/06* (2013.01)

(58) Field of Classification Search
CPC ............. G06Q 30/0621; G06Q 30/0601–0645
USPC ............................................. 705/26.1–27.2
See application file for complete search history.

(56) References Cited

U.S. PATENT DOCUMENTS 9,827,714 B1 * 11/2017 Ruxton ............... G06Q 30/0621
10,074,124 B1 * 9/2018 Evans ................. G06Q 30/0621
2014/0344091 A1 * 11/2014 Krebs .................... B29C 64/112
705/26.1

FOREIGN PATENT DOCUMENTS

CA 2938980 A1 * 8/2015 ......... G05B 19/4097

OTHER PUBLICATIONS

Sarah Perez, Zazzy's new marketplace lets you design and sell your own 3D printed jewelry, Apr. 8, 2015 (2015) (Year: 2015).*

* cited by examiner

*Primary Examiner* — Allison G Wood
*Assistant Examiner* — Jason B Warren
(74) *Attorney, Agent, or Firm* — William S. Parks

(57) ABSTRACT

An on-line method of facilitating e-commerce sales of circular adornments (such as watches, bracelets, etc.) through the provision of selectable representations of such an adornment in its primary dimensions is provided. Such representations are generated in relation to specific adornment structures and are provided, in terms of three-dimensional polymer printed articles. A purchaser is allowed to select a specific adornment from an on-line source, and print a single part or multiple parts thereof in the form of a reliable representation of the subject article. The purchaser may then place the representation on his or her wrist, ankle, arm, etc., in order to gauge and assess the look, placement, and size thereof, in accordance with his or her own tastes and needs. Such an on-line system allows for reductions in returns and greater reliability in terms of actual purchases up front. The actual generated printed representations are encompassed herein as well.

2 Claims, 2 Drawing Sheets

(51) Int. Cl.
*G05B 19/4099* (2006.01)
*B33Y 50/02* (2015.01)

SYSTEM OF ON-LINE SALES OFFERINGS OF CIRCULAR ADORNMENTS WITH RELIABLE SIZE AND SHAPE 3-D POLYMER REPRESENTATIONS

CROSS-REFERENCE TO RELATED APPLICATIONS

This application is a divisional of co-pending U.S. patent application Ser. No. 14/956,225, filed on Nov. 20, 2015, the entirety of herein being incorporated by reference.

FIELD OF THE INVENTION

An on-line method of facilitating e-commerce sales of circular adornments (such as watches, bracelets, anklets, and the like) through the provision of selectable representations of such an adornment in its primary dimensions is provided. Such representations are generated in relation to specific adornment structures and are provided in terms of three-dimensional polymer printed articles. In such a situation, the purchaser is allowed the ability to select a specific adornment from an on-line source, and print a single part or multiple parts thereof in the form of a reliable representation of the subject article. The purchaser may then place the representation on his or her wrist, ankle, arm, etc., in order to gauge and assess the look, placement, and size thereof, in accordance with his or her own tastes and needs. In this manner, the utilization of such an on-line system allows for reductions in returns and greater reliability in terms of actual purchases up front. The actual generated printed representations are thus encompassed within this invention as well.

BACKGROUND OF THE INVENTION

E-Commerce (such as purchasing goods from an on-line website merchant) has become a standard platform throughout the world. The convenience of shopping from a computer source, through initial product review, to comparison for prices and quality of different sites and products, to ultimate decision and purchase, itself, has altered the merchandising world, to say the least. Although brick and mortar businesses still exist, the ability to make purchases that come to one's door, rather than having to travel to certain businesses physically, creates situations that certain persons would rather avoid. As a result, whether through large-scale distributor websites (such as, for example, AMAZON), or individual sites devoted to specific types of products, e-commerce is here to stay, definitely.

Unfortunately, however, even with certain efficiencies and facilitated purchasing potentials, such e-commerce platforms still suffer from certain drawbacks, particularly as it concerns the purchase of articles that are meant to be worn (clothing, shoes, jewelry, etc, as examples). Determining, from a distance (particularly over an Internet connection), the appropriate size of the offered article is one consideration; additionally, however, aesthetics and even relation to a specific user's own physical traits (for overall appearance, for instance) and even personal tastes may cause certain problems for the purchaser for a product offered on a website. For instance, if a watch is purchased on-line, the chance to appropriately view such an article adorned around a specific user's wrist is lacking, leading to the distinct chance that the purchaser will return the article back to the distributor if any size, shape, or even aesthetic consideration does not meet the purchaser's requirements. In such situations, the costs borne for such an action are typically taken on by the merchant, thereby not only causing a loss of a sale, but also loss in terms of the costs involved with such a return (not to mention return, potentially, at least, of the initial postage and handling costs associated with the initial sale of such a good). Furthermore, the potential for further damages to such a product increase when placed within the mails and handed to and from the initial seller (and, subsequently, the purchaser). Damages would require repair, of course, and may lead to the necessity of informing future potential purchasers of the product's condition, as well.

As it concerns certain products that are offered for adornment around a purchaser's (or possibly provided as a gift to another person by a purchaser) wrist, arm, neck, ankle, etc., as a circular structured article (such as, a watch, necklace, bracelet, anklet, and the like), there exists a number of issues pertaining to e-commerce sales. It is difficult for a purchaser to assess size and shape of such articles from a computer website. Even with a depiction provided on-screen that is of a specific size (or provided in a ratio to actual size and shape), the ability to actually consider the overall appearance when worn is not permitted. As such, purchasers are at a disadvantage in such situations, limiting their actual purchasing choices to articles that are first seen in actual size and shape when delivered physically. For that matter, many potential purchasers may even avoid shopping on-line, all together, due to the lack of proper assessment capabilities through a simple view and click system. Without the potential to compare and contrast through specific placement considerations, size assessments, and appearance concerns, many purchasers will not only avoid on-line activities for such adornments, but may actually undertake more expensive actions through travel to and from certain locations to view and wear such items in person. The possibility that purchasing from an on-line source may lead to returns and general unhappiness with the resultant item may lead to avoidance of such web-based purchases in total.

Additionally, as noted above, these types of purchasing decisions are also susceptible to undesirable returns after the purchaser has the chance to finally review the dimensions and overall look of the purchased article when worn. If the watch, bracelet, necklace, etc., is smaller, larger, etc., than expected, the chances of return to the seller increases, thereby resulting in a lost or delayed sale and potential return to inventory. Furthermore, if, during such an assessment, the item is damaged (such as leather straps stretched, watch face scratched or cracked, etc.), then the seller may prohibit returns. In such a situation, a potential purchaser may avoid such a situation and opt, again, for in-person activities rather than chance a possible undesirable item that may be damaged in their possession.

An improved manner of allowing a potential purchaser pre-sale assessment for such considerations is thus of great interest within such an e-commerce segment. To date, there has yet to be provided any means to permit physical comparisons and considerations to such potential purchasers to best avoid these post-sale problems. The invention herein provides such a needed improvement within this e-commerce marketplace.

ADVANTAGES AND SUMMARY OF THE INVENTION

An advantage of the invention is the facilitation of purchasing decisions for certain wrist, neck, ankle, arm, and the like, circular adornments through a direct provision of printable articles or components of a selected article including all the necessary dimensions thereof for placement on and around a person's wrist, neck, ankle, arm, and the like, prior to actual purchase. Another advantage is the ability to provide an initial circumference measurement gauge that correlates to other article dimensions optimized in relation to such an initial consideration, thereby allowing for printing of a suitable representation for comparison purposes prior to sale. Another advantage is the ability for a potential purchaser to thus assess an overall appearance and look of a suitably dimensioned representation in a three-dimensional polymer printed form prior to an on-line purchasing decision.

Accordingly, the invention encompasses a method of providing a purchaser of a circular structure adornment for wearing around a person's wrist, neck, arm, leg, shin, or ankle from a website merchant, said method including the provision of a pre-sale assessment of the size and shape of said circular structure adornment in relation to a subject person's wrist, arm, neck, leg, shin, or ankle, as well as in relation to the appearance and look of said circular structure adornment when placed around said subject person's wrist, arm, neck, leg, shin, or ankle, said pre-sale assessment comprising the steps of: a) providing a selection of potential circular structure adornments on an on-line website for purchase; b) providing a link to each of said adornments provided on said website, wherein said link includes a print function for a three-dimensional polymer representation of said adornment, wherein said representation includes all of the dimensions of said selected adornment; c) selecting a specific adornment and clicking on the associated link thereof; d) further selecting the print function in association with a suitable three-dimensional representation thereof; e) printing said three-dimensional representation; and f) adorning said three-dimensional representation on a subject person's wrist, arm, neck, leg, shin, or ankle to assess the overall size, shape, and appearance thereof prior to purchase thereof from said on-line website. Such a method may also include the overall steps of: a) providing on said merchant's website a link to a sizing gauge, said sizing gauge provided as a printable measuring device in relation to different sizes associated with said circular structure adornment; b) printing said sizing gauge and placing said gauge around a selected portion of said subject person's wrist, arm, neck, leg, shin, or ankle to generate a specific circumference measurement; c) inputting the resultant circumference measurement into a link on said merchant's website, wherein said link then filters specific circular structure adornments associated with such a circumference measurement; d) generating selections of specific circular structure adornments of the type desired for potential purchase associated with the filtered circumference measurement; e) permitting said purchaser to select a complete printable three-dimensional polymer representation of a specific circular structure adornment from step "d"; f) printing three-dimensional polymer representation including definite width, length, height, and depth dimensions of the overall circular structure adornment as well as the ornamental appearance thereof; and g) applying said three-dimensional polymer printed representation around said subject person's wrist, arm or ankle to assess the overall size and shape associated thereto for proper aesthetic determinations prior to purchase. The printable representations may be provided intact or assembled for such a purpose, with flexibility to permit such circumferential placement around a subject person's wrist, arm, neck, leg, shin, or ankle. Additionally, through the initial filter procedure, the subject purchaser may adjust the selected circular structure adornment representation after initial assessments to increase or reduce such a size and shape on demand for a further representation to be generated for subsequent assessment purposes. Furthermore, the resultant measurement results from the initial gauge utilization may be stored on the website for future purchase purposes with or without the need to generate different representations for assessments of different circular structure adornments for potential purchase (as long as the same body portion, being the subject person's wrist, arm, neck, leg, shin, or ankle, is the subject of such an adornment purchase, of course). The overall method may also include photographing the wearer in order to upload to the purchasing website (or app) for comparisons, comments, and other like actions.

As alluded to above, significant difficulties persist with on-line commercial activities, particularly when sales are based upon pictorial representations and legends providing ranges of sizes applicable to such wearable articles. Even with those initial offerings to facilitate, to a certain extent, purchasing decisions in such an on-line format, the chances that the selected and purchased good (such as a watch, necklace, bracelet, anklet, etc.) does not meet the purchaser's criteria (whether aesthetically, dimensionally, or both) is generally quite high. Thus, a procedure that accords greater reliability for the purchaser to make an informed decision prior to payment and delivery is a significant improvement within such an e-commerce area. Of particular difficulty are such watch, bracelet, anklet, necklace, and the like, articles that involve a number of considerations to meet a purchaser's tastes, size and shape requirements, and other issues.

The inventive method thus provides a reliable manner of providing a representation to a potential purchaser in relation to circular structure adornments (such as wearable items that are provided in full circular form or in a connectable configuration around a person's wrist, ankle, forearm, biceps, shin, neck, and the like, and thus selected from a group included, without limitation, watches, with expandable or connectable bands, bracelets, necklaces, anklets, wristbands, armbands, and the like) offered for sale through an on-line website. Such adornments are, by their very nature, difficult to assess in terms of actual size, shape, and ultimate appearance on and around a person's wrist, neck, ankle, etc., when offered in such a manner. The overall inventive method thus takes this into account and provides an optional new way of permitting a user a reliable capability of pre-sale decision making through an initial alternative request for a potential purchaser to link, or otherwise, access a downloadable and printable size gauge from the website itself. Such a gauge is presented in graduated format with indicia for each incremental measurement related to sizing of a specific type of circular structure adornment. Thus, if the potential purchaser seeks a watch, the gauge made available pertains to watch sizing measurements; the same for necklaces (and the like), and bracelets, and so on. Such a gauge is presented on the website as a downloadable and printable link, image, or other type of manifestation that is configured on-line through suitable software code. Such an optional gauge may appear as a standard ruler with the proper indicia for the type of adornment involved included for such a measurement purpose, or in any other format that allows for utilization by a user to measure around his or her wrist, arm, neck, ankle, etc., as needed. Such an optional gauge thus permits the user to properly print a polymeric three-dimensional gauge (or possibly a paper representation) and then wrap such an implement around the subject area (wrist, neck, ankle, etc.) until the measured gradations provided align to denote the desired size associated with the selected type of adornment. Certainly, the user may tighten or loosen the printable cut-out to any selected distance, as well, to reflect any desired fit.

Once the alternative/optional gauge is in place and a measurement result is generated, the user may then input such a result within the on-line program. Otherwise, the user may simply input an estimated size into such a place within the program. Such a resultant indicator from the optional gauge is correlated then to a filter within the catalogue of products available from the on-line merchant that meets the overall type of article and the subject wearer's initial measurements. This makes it easier for the potential purchaser to review the actual product offerings that are of interest (in other words, for, for example, watches, the initial gauge measurement is plugged into the system and the filtered results are then provided that are available for purchase and that meet such results; if a certain watch is not offered within the same measurements within the gauge range, it will not be presented for further consideration for the potential purchaser). Importantly, however, such results and filtered product offerings are not the only types that are to remain available for purchase, ultimately; the initial articles, however, are threshold considerations for the potential purchaser to make certain decisions in relation to the next step(s) permitted within the overall method.

Thus, once the optional initial gauge results generate filtered product offerings for the user, such a person may then review those results and decide if a certain design, configuration, etc., appears within a certain realm of aesthetics or other criteria desired of and by the potential purchaser. Once one (or more) such product is settled upon for more in-depth review and/or consideration, the on-line system would permit the user to select a "print" function. This function will thus provide a basis to generate a three-dimensional polymer printed representation of the desired article. The program itself thus includes code to correlate the selected article and the prior inputted gauge results to generate the desired three-dimensional plastic representation of the article. In flexible polymer form, as well, such a structure would be easily manipulated and applied around the user's (or other person's) neck, ankle, wrist, arm, etc., depending on the intended recipient (of course, the potential purchaser may perform his or her own estimations as to wrist, ankle, etc., size, if such a product is to be gifted or presented to a different wearer, as well). Either representation would include, then, the actual width of the article (for a watch, this would primarily concern the watch band, as it generally either expands and contracts around a user's wrist, or is provided with two separate ends joined by a clasp or other like structure; for a necklace or bracelet, such a width is well understood and, generally, at least with non-expandable necklaces and anklets, will include a connection device for resilient attachment. Such connections are likewise represented in the printed structure for such a purpose. Bracelets may be provided in either manner, as well (expandable or with a clasp or like object for connecting purposes). Thus, the desired length (ostensibly provided within the initial gauge measurement) is depicted within the representation, too. The remaining considerations are, for instance, the watch face housing, or perhaps add-ons (jewels, for instance) on a bracelet, anklet, necklace, and the like, that would alter the base circular adornment structure, at least to a certain extent, and would need some semblance of inclusion for the user to make a reliable decision for purchase. Such structural considerations are thus included within the three-dimensional polymer printed representation. Such structures would (hopefully) be provided in significant definition within a three-dimensional (3D) representation and thus would be ordered by the user through the simple request for a certain article representation to be generated on demand. Thus, without having the actual product before a potential purchaser, the ability to generate specifically sized and shaped versions for actual placement on and/or around a desired appendage is the closest such a person will get to the actual item.

Likewise, then, upon actual application of a representation in such a manner, the user (potential purchaser) would then have the capability to consider the actual dimensions involved and have a reliable view of their basic appearance of the same while adorning a certain person. If the design/configuration does not meet such a person's own criteria for purchase, a new article may be easily generated in like manner, either within the filtered range of articles already provided, or, if desired, through a modification of the gauge results. Basically, the overall program allows for such an alteration in measured results "on the fly" by not only reassessing the initial gauge, but also taking a representation already printed and in use and requesting the system to generate another structure having larger or smaller dimensions, whether in terms of width, height, depth, or even length, if desired. Such polymeric printed structures (3D) are typically provided in monochrome fashion (white or gray, though black has been utilized, as well as any primary or secondary color, at least), or even with paper portions colored for adhesion to 3D surfaces to meet a certain decorative state for proper consideration purposes. Certainly, however, multi-color polymeric results may also be undertaken with the necessary colored prepolymer structures provided in such a manner.

Certainly, a unique quality resides herein with the necessity of generating a three-dimensional polymer representation (rather than an actual three-dimensional working article) for assessment purposes. As well, the alternative utilization of an initial filtering gauge specifically for providing a directed offering of adornment articles for review and potential purchase by a user, followed by the provision of specific representations of such subsequently selected pieces for comparison and remote considerations when applied to a person's wrist, arm, ankle, neck, etc., is unique, as well. Importantly, though, the inventive system provides, as noted above, article representation in three-dimensional polymer printed format that are configured to meet the dimensions of the actual adornment structure itself. In other words, the inclusion of not only a "flat" band for a watch adornment structure representation, the watch face is provided with the basic face component, but also the housing structure in terms of its depth. In this way, the user may more readily and easily make a judgment as to aesthetics and style, at least, if not comfort and overall viability, for that matter, as a watch prior to purchase. As it is, such a three-dimensional polymer printed representation has yet to be provided for such comparison purposes within the prior art for any type of on-line purchase, let alone one that pertains strictly to circular structure adornments. Thus, although the utilization of a gauge for filtering purposes is a suitable means to achieve greater efficiencies for a potential purchaser through an on-line commercial platform in this situation, the further capability of having generated such three-dimensional results in polymer form (printed, assembled, and applied for such comparisons) has yet to be provided within the prior art to any degree.

Furthermore, the overall system is unique, as well, in terms of utilizing either such an initial gauge for input of certain measurements that generate a collection of product offerings limited to such initial measurements for a potential purchaser, and/or the correlation of selected products for remote comparisons that are provided through such inputted measurements and selection of specific products. Thus, when a potential purchaser provides his or her (or another person's) subject measurements (for a position around, for instance, a wrist, an ankle, neck, arm, and the like) the system then stores such data and, once a certain adornment article for review is selected, the representation generated in response to such selection is automatically adjusted to meet the initial measurement requirements. Such requirements may be in relation solely to the circumferential distance involved or may also take into consideration other factors, such as the expected size and shape that would best correlate to such a circumferential measurement. In other words, for instance, if a person with a small wrist circumference is measured and the resultant numbers are inputted into the system, the process not only includes providing such a limited and narrow range of possible lengths (for a bracelet or watch, for instance) for such a specific person, but the circumferential data may also be utilized to generate a certain bracelet size (width wise, or even in terms of add-on structures, such a jewels, and the like, that would complement such a size around such a specifically sized wrist) or watch size (to provide a complementary watch face size, for example, as too large a face would invariably look awkward in relation to a relatively small wrist size). Thus, again, such a system facilitates an efficient method of not only honing in on a certain type of circular structure adornment for a specific user for potential purchase, but also ultimately allows for generation of proper representations for such a potential purchaser to make remote, but in-person comparisons and considerations for eventual purchasing decisions in a far more reliable fashion than for remote on-line viewing of products solely on a computer screen.

Hence, the system includes a background software program that undertakes at least the capability of correlating a user's inputted measurement (whether via the gauge or not) with a certain type of selected product offering to ultimately generate, on demand, a three-dimensional polymer representation of the actual product meeting the measurements, etc., specified by the user at that moment. The flexible nature of the polymer (such as polyethylene, polypropylene, polycarbonate, and any other typical 3-D printer material that is provided in single "dots" that are instantly cured, such as through UV light exposure, as one example) that is flexible to the necessary degree when fully integrated into such a representation, thus allows a potential purchaser the desired capabilities to assess such aesthetic, size, shape, etc., criteria prior to purchasing. With this in place, at least theoretically, the chances of a purchaser then undertaking selection and buying of a circular structure adornment that does not meet their expectations in such terms, can be avoided. With this in place, at least theoretically, the chances of a purchaser then undertaking selection and buying of a circular structure adornment that does not meet their expectations in such terms, can be avoided. Additionally, then, the purchaser may easily retain such a representation or representations for comparison after the purchased items is actually received. If the resultant size and shape of the purchased item do not match the prior representation thereof, such an issue would certainly be a proper means to make a return (or exchange). In certain situations, it may be incumbent upon the purchaser to show that the purchased item and the polymer representation do not match in substantially similar size, shape, etc., to allow for a direct return, as well. Thus, the ability to provide exact measurements, sizes, shapes, etc., through such an on-line platform would be of great importance, clearly. The correlation, then, of the provided measurements, etc., for input within the system with the software code generating the representations and product offerings for comparisons and considerations prior to purchase must be as exact as possible.

Also, as alluded to above, the ability to also photograph the actual adornment worn by the wearer (purchaser, giftee, etc.) prior to purchase and uploaded to the website itself could be incorporated herein as well. Such a possible action may thus allow the wearer, giftee, etc., the ability to view his or her resultant photograph with the polymer representation in place and the website may provide suitable feedback, if desired, as to its overall appearance in such a manner. There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The advantages of the disclosure, along with the various features of novelty which characterize the disclosure, are pointed out with particularity in the claims annexed to and forming a part of this invention disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE DRAWINGS AND PREFERRED EMBODIMENTS

Figure 1:
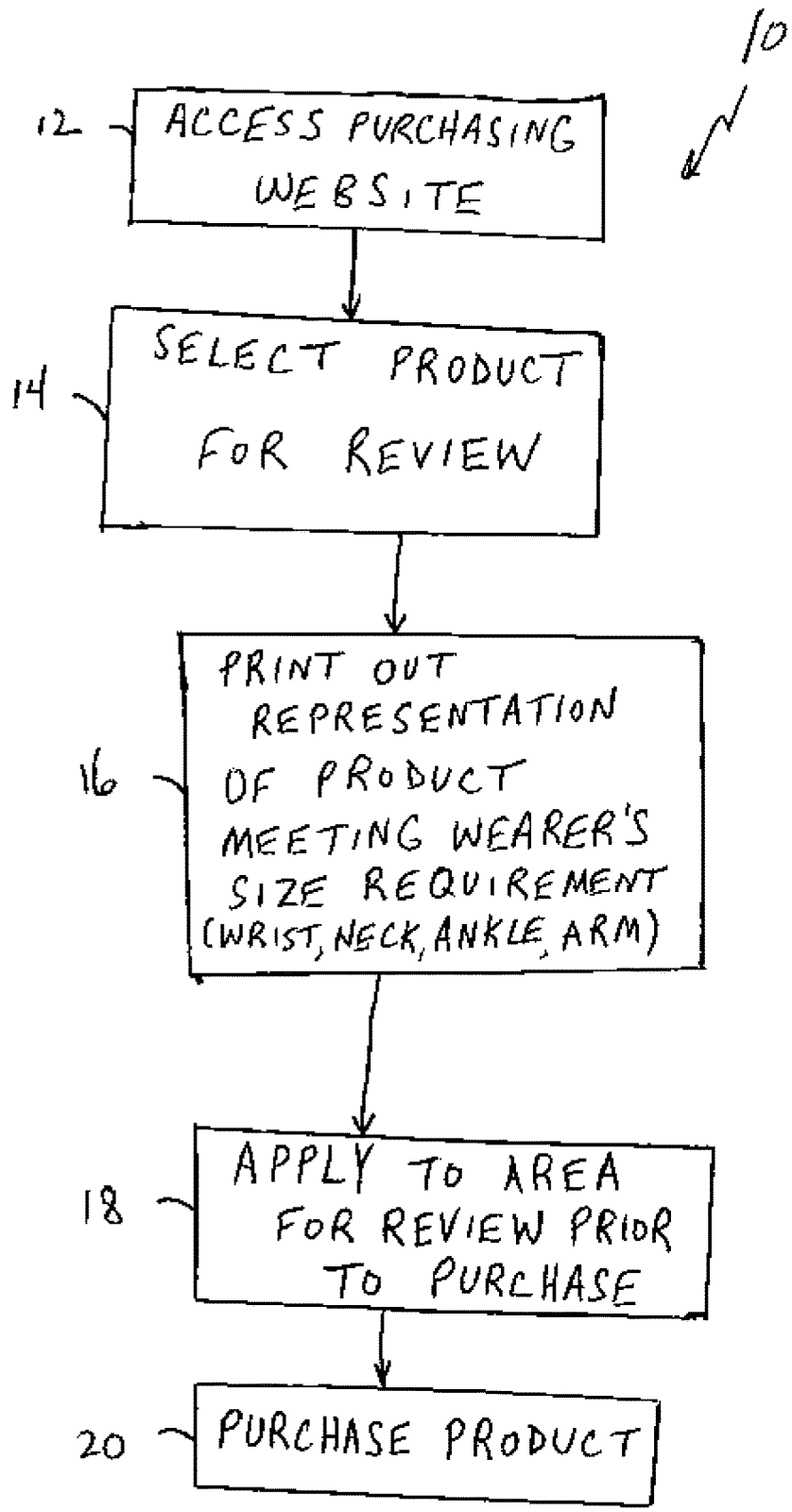
FIG. 1 is a flow chart showing one potentially preferred embodiment of the inventive system for circular structure adornment product purchasing from an on-line platform.
Figure 2:
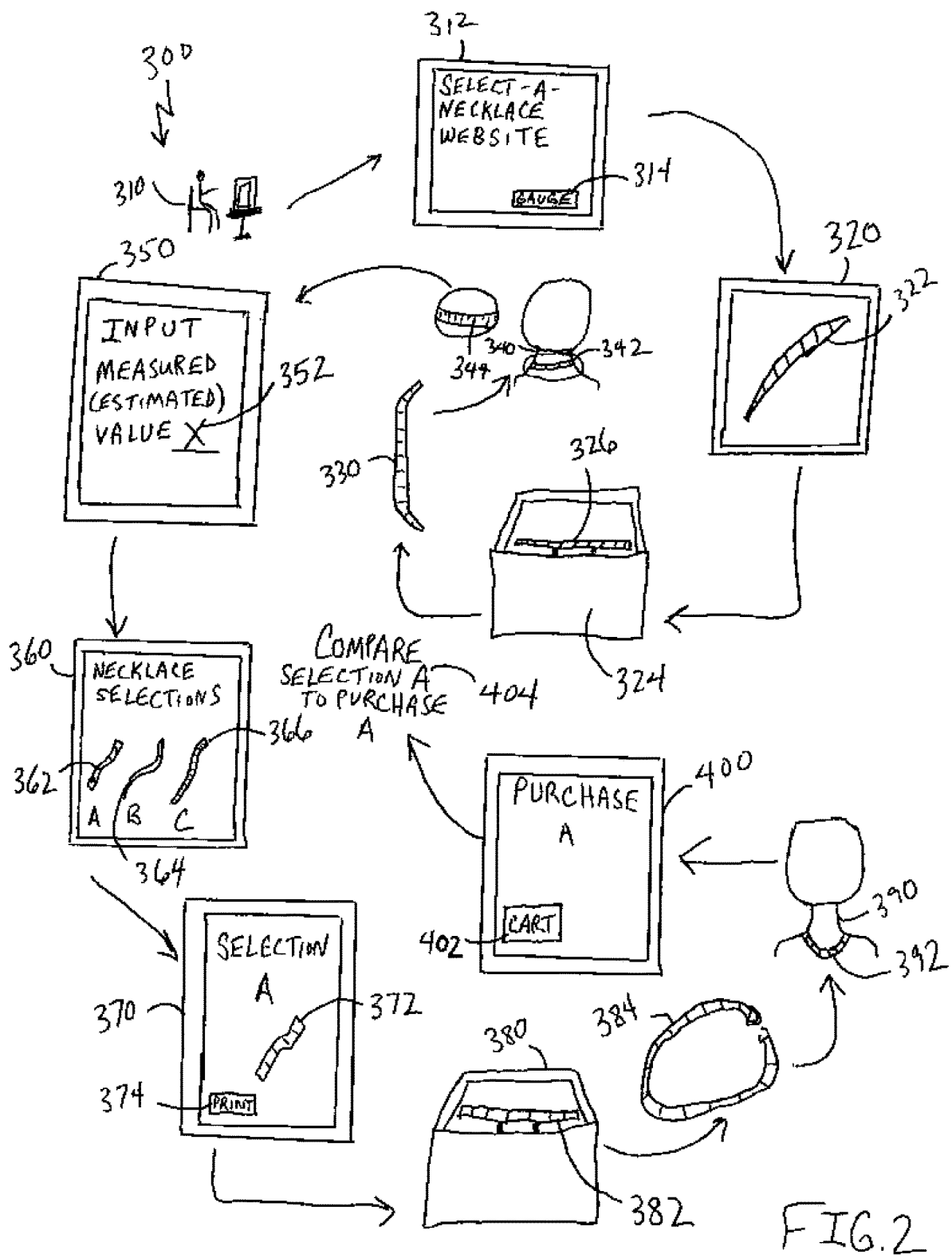
FIG. 2 shows a schematic flow chart showing another potentially preferred embodiment of the inventive system as noted in FIG. 1, with the method relying upon a three-dimensional polymer printout for review of a watch purchase.

With reference now to the drawings, FIGS. 1 and 2, a new method of comparison and purchase of circular structure adornments from an on-line platform embodying the principles and concepts of the invention, without any limitation of breadth of the overall invention intended.

FIG. 1 shows a broad flow chart of the inventive method of providing a printed representation of a circular structure adornment (such as, without limitation, a watch, a necklace, a bracelet, an anklet, or other circularly shaped article for adornment around a person's wrist, neck, ankle, arm, leg, and the like) for a remote, on-line purchase activity 10. Such a method, as discussed above, allows for a potential purchaser the ability to reliably consider the aesthetics, size, shape, etc., of such a remotely provided article without having the actual article delivered for such a purpose. Thus, the method first includes a user accessing the subject website 12 pertaining to such a collection of commercial circular structure adornments for sale. The website 12 includes an operator to select a specific product for review prior to any purchase 14, which may be considered as the first actual step after access to the website 12; however, as shown in FIG. 2, a first step may also include a gauge measurement action (142, 144 of FIG. 2, 342, 344 of FIG. 3) to allow for filtering of more specific products of interest to the purchaser that fit within a certain size (and possibly shape) criteria. Upon selection of a product for review 14, the user may then print a three-dimensional polymer representation thereof 16 that meets certain initial criteria (size, shape, etc.) for the type of adornment desired (for a person's wrist, neck, arm, ankle, etc.). The application of such a printed out product to the wrist, neck, ankle, arm, etc., as necessary 18 then permits proper review by the user for comparisons and considerations of aesthetics and other further purchasing criteria as needed without, again, the actual product present. Ultimately, then, if such a review 18 meets the needs and wants of the user, such could then be purchased on-line 20 for delivery thereof in the future. Of course, if the first or any number of review steps 18 of different types of products are necessary for the user to determine a specific adornment meets his or her criteria for purchase, such extra method steps fall within the scope of such a method, as well. Likewise, if the user decides, after such reviews 1 not to make such a purchase of an offered circular structure adornment from the e-commerce website, such a method still falls within the scope of this overall method as the purchase is not a required step, just one that may occur as an alternative. The important limitations of the present invention pertain to the utilization of a certain three-dimensional representation printed from a selection made on the website by the user for such review purposes before any potential purchase.

FIG. 2 thus shows a schematic of one potential embodiment of the invention in greater specificity as to the commercial offerings of necklaces utilizing polymer printable three-dimensional representations for initial reviews and comparisons prior to potential purchase 300. Such an embodiment for such an e-commerce-based necklace offering method includes the access of a computer website by a user 310, such as a necklace purchasing website 312 including, in this potential embodiment, an optional initial size gauge 314 that is accessed on a screen 320, printed, in this instance, to a polymer structure printer 324 (including, as noted above, "dots" of prepolymer on a base structure that are instantly cured with UV light, or other type of standard polymerization agent or agents), generating a three-dimensional gauge version 326 (as another alternative, such a gauge may be printed on paper and cut-out and applied around the subject person's arm, neck, wrist, leg, shin, etc., as well for such a purpose). The optional finished gauge 330 can then be applied around, in this instance, a user's neck 340 in a desired fashion and location thereon to provide a measurement 342 of the actual desired length and size associated with such a neck size and possible shape consideration. The optional gauge measurement 344 is then inputted within the website 350 as a gauge value 352 that is then converted by the program within the site to automatically generate a selection of actual necklace products that not only are provided in relation to the optional gauge measurement 352, but also in terms of any other criteria that relate to the actual neck size 342 involved (in other words, the program assesses the actual neck measurement from the optional gauge to determine possible necklace thickness, length to drape on the wearer's upper chest, and other shape issues, at least, that would work best aesthetically with such a neck size). If the optional gauge 330 is not utilized, the user may simply input an estimated neck size instead. The resultant screen 360, in relation to either the gauge value 352 or estimated and inputted neck size, thus provides a plurality of products meeting such neck size criteria 362, 364, 366 (here three are provided as A, B, and C, with different necklace thicknesses, repeating structures, etc., and/or sizes and/or appearances, but any number may be provided for consideration and selection by the user on a single screen or multiple successive screens). From such a selection 360, the user then can choose any number for further consideration, with here a single selection A (362) present on a selection screen 370 (typically one selection at a time would be undertaken, but the ability to print may actually be provided on the prior screen 360, if desired, with each provided product 362, 364, 366 having its own print link, such as 374 on screen 370). The ability to then print a representation of the selected product 362 is provided with a print link 374 that prints to a three-dimensional polymeric printer 380 (which may the same or different as above 324), generating a polymeric version 384 of the selected product 362. The polymeric version 384 thereafter includes an entire representation (including clasp and connector). The user can then apply the resultant three-dimensional structure 392 around his or her neck 390 for review of aesthetics, size, shape, etc., as noted above (such as in a mirror, for instance). If desired, then, and if such a review leads the purchaser to decide such a representation 392 meets his or her purchase requirements, the user can then access a purchase screen 400 and select such a product for placement in an on-line cart 402 (as above). Subsequently, then, if desired, the printed representation 384 may then be kept and compared with the actual purchased product 404, thereafter, to check to see if such a purchase met the same basic appearance provided by the printed representation 384.

As noted above, such a method can be utilized for sizing and purchasing watches, bracelets, necklaces, anklets, and any other circular adornments for a person to wear around one's neck, wrist, arm, shin, ankle, and the like. Thus, any other circular adornment of this type may be substituted within the preceding method depicted, in FIG. 2, above (and thus such would be well understood by the ordinarily skilled artisan).

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

What I claim is:

1. A system for providing a direct pre-sale representation to a purchaser of a circular structure adornment for wearing around a person's wrist, neck, leg, shin, arm, or ankle from an on-line website merchant, said system including: i) an on-line website providing said purchaser a direct representation of a plurality of for-sale circular structure adornments in relation to the sizes, shapes, and appearances thereof said plurality of circular structure adornments, in relation to and when applied around a subject person's wrist, neck, leg, shin, arm, or ankle; wherein each of said different circular structure adornment is offered as having said different sizes, shapes, and appearances, wherein said website includes proper computer code pertaining to each different circular structure adornment in relation to every available size, shape, and appearance thereof of each of said plurality of for-sale circular structure adornments; ii) a link present on said on-line website to a sizing gauge, said sizing gauge provided as a printable measuring device in relation to different sizes associated with each of said circular structure adornments, wherein said link includes a print function related to said sizing gauge in order to generate and print said gauge for a circumference measurement around a selected portion of said subject person's wrist, arm, or ankle to generate a specific circumference measurement; iii) a data input link present on said on-line website for the resultant circumference measurement of said selected portion of said subject person's wrist, neck, arm, leg, shin, or ankle into a link on said merchant's website, wherein said data input link filters specific circular structure adornments associated with such a wrist, neck, arm, leg, shin, or ankle circumference measurement; iv) a result-generating link within said on-line website providing at least one selection of a specific circular structure adornment of the type desired for potential purchase associated with the filtered circumference measurement, said at least one selection relating to said computer code associated with the size, shape, and appearance thereof; v) a link present on said website to said computer code pertaining to each said size, shape, and appearance of said at least one circular structure adornment selection provided thereon, wherein said link includes a print function related to said computer code in order to generate and print a three-dimensional polymer representation for said at least one selection of a circular structure adornment provided thereon; vi) a three-dimensional printer, wherein said three-dimensional printer functions in relation to said link on said website and said computer code pertaining to the size, shape, and appearance of said at least one selection of a circular structure adornment provided thereon, wherein said system allows for the printing of a selected circular structure adornment of any size, shape, and appearance of each available for-sale circular structure adornment through activation of said link associated therewith; and vii) a circular structure adornment purchase link within said on-line website for order and purchase by said purchaser of at least one circular structure adornment; wherein said purchaser or said subject person utilizes said sizing gauge for generation of at least one selection of a direct pre-sale representation of a circular structure adornments as the basis of such order and purchase.

2. The system of claim 1 wherein said circular structure adornment is selected from a watch, a necklace, an anklet, and a bracelet.

* * * * *